United States Patent [19]

Cohen et al.

[11] 4,414,352

[45] Nov. 8, 1983

[54] THERMOPLASTIC MOLDING COMPOSITIONS AND PROCESS

[75] Inventors: Stuart C. Cohen; Robert J. Kostelnik; Allen D. Wambach, all of Evansville, Ind.

[73] Assignee: General Electric Company, Pittsfield, Mass.

[21] Appl. No.: 197,132

[22] Filed: Oct. 15, 1980

Related U.S. Application Data

[63] Continuation of Ser. No. 35,090, May 1, 1979, abandoned.

[51] Int. Cl.$^3$ .................................................. C08K 3/34
[52] U.S. Cl. ..................... 524/443; 524/444; 524/449; 524/451; 524/455; 524/513
[58] Field of Search ............. 260/40 R; 525/513, 443, 525/444, 449, 451, 455

[56] References Cited

U.S. PATENT DOCUMENTS

| | | | |
|---|---|---|---|
| 3,833,535 | 9/1974 | Wambach | 260/40 R |
| 3,855,277 | 12/1974 | Fox | 260/40 R |
| 3,915,926 | 10/1975 | Wambach | 260/40 R |
| 3,953,394 | 4/1976 | Fox et al. | 260/40 R |
| 3,963,669 | 6/1976 | Wurmb et al. | 260/40 R |
| 4,013,613 | 3/1977 | Abolins et al. | 260/40 R |
| 4,035,333 | 7/1977 | Kamada et al. | 524/605 |
| 4,052,356 | 10/1977 | Breitenfillner et al. | 260/40 R |
| 4,064,098 | 12/1977 | Saitoh et al. | 260/40 R |
| 4,101,502 | 7/1978 | Khattak et al. | 260/40 R |
| 4,111,892 | 9/1978 | Kamada et al. | 524/411 |
| 4,125,514 | 11/1978 | Stabler | 260/40 R |
| 4,140,669 | 2/1979 | Phipps et al. | 260/40 R |
| 4,296,021 | 10/1981 | Wambach | 524/494 |

FOREIGN PATENT DOCUMENTS 52-58752  5/1977  Japan .
754679  7/1975  South Africa .

*Primary Examiner*—J. Ziegler
*Attorney, Agent, or Firm*—Hedman, Casella, Gibson, Costigan & Hoare

[57] ABSTRACT

Flame-retardant thermoplastic molding compositions having improved physical and electrical arc track resistant properties are provided, the compositions comprising an intimate admixture of (a) a high molecular weight poly(1,4-butylene terephthalate) homo- or co-polyester,
(b)(i) a copolymer of ethylene and vinyl acetate in combination with an aromatic polycarbonate;
(ii) poly(ethylene terephthalate); or
(iii) reinforcing glass;
(c) a flame retardant agent; and
(d) a mineral filler.

17 Claims, No Drawings

THERMOPLASTIC MOLDING COMPOSITIONS AND PROCESS

CROSS-REFERENCE TO RELATED APPLICATION

This application is a continuation of application Ser. No. 35,090, filed May 1, 1979, now abandoned.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319, and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injection-moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

Recently, block copolyesters, wherein the major portion of the repeating units are poly(1,4-butylene terephthalate) blocks, have been found to have enhanced impact resistance. See copending application U.S. Ser. No. 752,325, filed Dec. 20, 1976 which is now abandoned.

Enhanced impact resistance has also been reported when poly(1,4-butylene terephthalate) and block copolyesters have been combined with impact modifiers comprising resins, e.g., block copolymers of vinyl aromatics and dienes, in combination with aromatic polycarbonate resins and a mineral filler. Flame retardant such compositions are also known. See copending application, U.S. Ser. No. 966,854, filed Dec. 6, 1978 which is now abandoned.

Stable polyblends of poly(1,4-butylene terephthalate) and poly(ethylene terephthalate) can be molded into useful unfilled and filled articles. See Fox and Wambach, U.S. Pat. No. 3,953,394.

In general, poly(1,4-butylene terephthalate) resins are known to be suitable for combination with glass fiber reinforcement and/or flame retardant agents.

U.S. Pat. No. 3,937,757 teaches that the electrical arc tracking resistance of unfilled poly(1,4-butylene terephthalate) compositions can be improved by the addition of from 5 to 50% by weight of a polyolefin or ethylene copolymer, containing at least 50% by weight ethylene units thereto.

Copending application U.S. Ser. No. 972,888, filed Dec. 26, 1978, discloses that the arc track resistance of poly(1,4-butylene terephthalate) compositions can be improved by forming a combination of the polyester resin, a copolymer of ethylene and vinyl acetate and a filler, and then post-reacting them.

The above-mentioned patents and applications are incorporated herein by reference.

Unfortunately, however, the attempted use of flame retardant agents in such compositions causes a lowering of arc track resistance, and this is further lowered if such flame retardant modifications are further compounded with blends of a polyolefin or olefin copolymer and an aromatic polycarbonate, or poly(ethylene terephthalate), or glass fiber reinforcement.

It has now been discovered that if a mineral filler is included in such flame retardant modifications, in a controlled amount, there is a surprising improvement in arc track resistance (as measured by ASTM D-495 test) as compared with the corresponding non-mineral filled flame retardant blends. This discovery permits the use of such polyester compositions in such fields as parts for automotive electrical systems, and the like.

DESCRIPTION OF THE INVENTION

According to this invention, there are provided flame-retardant thermoplastic compositions which are useful for molding or extrusion, e.g., injection molding, injection blow molding, compression molding, transfer molding, profile extrusion, sheet extrusion, wire coating, extrusion blow molding and the like, the compositions having improved physical properties, such as impact resistance, and electrical properties, such as arc track resistance, the compositions comprising an intimate admixture of:

(a) a high molecular weight poly(1,4-butylene terephthalate) homo- or co-polyester,
(b) (i) a copolymer of ethylene and vinyl acetate in combination with an aromatic polycarbonate;
(ii) poly(ethylene terephthalate); or
(iii) reinforcing glass;
(c) a flame retardant agent; and
(d) a mineral filler.

The high molecular weight poly(1,4-butylene terephthalates), preferably high molecular weight linear such polyesters, used in the practice of the present invention are polymeric 1,4-butanediol esters of terephthalic acid and may include minor amounts of glycol esters of other difunctional acids, such as isophthalic, adipic, and the like. They are available commercially or can be prepared by known techniques, such as by the alcoholysis of esters of terephthalic acid with 1,4-butanediol and subsequent polymerization, by heating the diol with the free acids or with halide derivatives thereof, and similar processes. These are described in U.S. Pat. No. 2,465,319 and U.S. Pat. No. 3,047,539, and elsewhere.

The glycol portion of the polyester can contain minor proportions of the glycols from two to ten carbon atoms.

Illustratively, the high molecular weight poly(butylene terephthalate) (PBT) will have an intrinsic viscosity of at least 0.7 deciliters/gram as measured in a 60:40 phenol tetrachloroethane mixture at 30° C. At intrinsic viscosities of at least about 0.9 deciliters/gram for PBT, there is a further enhancement in toughness of the present compositions.

Block copolyesters are also useful in the compositions of this invention. These are generally prepared by the reaction of terminally-reactive poly(butylene terephthalate), preferably, low molecular weight, and a terminally-reactive copolyester or polyester in the presence of a catalyst for transesterification, such as zinc acetate, manganese acetate, titanium esters, and the like. The terminal groups can comprise hydroxyl, carboxyl, carboalkoxy, and the like, including reactive derivatives thereof. After initial mixing, polymerization is carried out under standard conditions, e.g., 220° to 280° C., in a high vacuum, e.g., 0.1 to 2 mm Hg, to form the block copolymer of minimum randomization in terms of distribution of chain segments. These copolyesters are described in copending U.S. application Ser. No. 752,325, filed on Dec. 20, 1976 which is now abandoned, incorporated herein by reference. For example, these block copolyesters are derived from (i) a terminally-reactive (poly(1,4-butylene terephthalate) and (ii) a terminally-reactive aromatic/aliphatic copolyester of a dicarboxylic acid selected from the group consisting of terephthalic acid, isophthalic acid, naphthalene dicarboxylic acids, phenyl indane dicarboxylic acid and compounds of the formula:

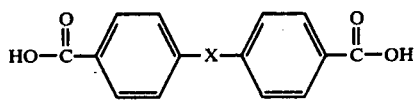

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid, or (iii) a terminally-reactive aliphatic polyester of a straight chain aliphatic dicarboxylic acid having from 4 to 12 carbon atoms in the chain and a straight or branched chain aliphatic glycol, said blocks being connected by inter-terminal linkages consisting essentially of ester linkages.

As to component (b)(i), the copolymers of ethylene and vinyl acetate useful in the practice of this invention may be derived from two or more monomers. Thus, the term "copolymers" herein is intended to include terpolymers and so on. Illustrative copolymers of ethylene and vinyl acetate contemplated herein include, for example, Alathon 3892, now referred to as Alathon 3194 (25% by weight vinyl acetate, 75% by weight ethylene), Alathon 3152 (15% by weight vinyl acetate, 85% by weight ethylene). Alathon 3180 (28% by weight vinyl acetate, 72% by weight ethylene). Vynathene EY903 (45% by weight vinyl acetate, 55% by weight ethylene) and Vynathene EY904 (52% by weight vinyl acetate and 48% by weight ethylene). The Alathons are products of the DuPont Chemical Co. and the Vynathenes are products of U.S.I. Chemicals. Among the terpolymers useful herein are included, for example, those prepared from ethylene, vinyl acetate and carbon monoxide (ELVALOY 741 or 742, sold by DuPont), ethylene, vinyl acetate and methacrylic acid and ethylene, vinyl acetate and acrylic acid (ELVAX 4260 and 4355 available from DuPont), and the like. With further reference to component (b)(i) the aromatic polycarbonate resins can be made in known ways and they are available from commercial sources, e.g., General Electric Company, Pittsfield, Massachusetts, under the trademark LEXAN. In general, any of the aromatic polycarbonates described in Baron et al., U.S. Pat. No. 4,034,016 can be used, especially those including units derived from bisphenol-A.

With respect to component (b)(ii), the poly(ethylene terephthalate) resins can be made in known ways and they are available from commercial sources, e.g., Goodyear Company, under the trademark VITUF, e.g., VFR-738-A7C. In general the intrinsic viscosity will be above about 0.4 deciliters/gram and preferably above about 0.6 deciliters/gram, as measured in a 60:40 phenol-tetrachloroethane mixture at 30° C.

With respect to component (b)(iii), conventional glass fiber reinforcement is used. This is available commercially from a number of sources. The grades suitable for electrical end uses are preferred.

For purposes of this invention, components (b)(i) and (b)(ii) are employed in amounts of from about 0.1 to about 25% by weight of the total composition. Particularly preferred amounts for best overall properties are in the range of from about 3 to about 15% by weight. Reinforcing amounts of component (b)(iii) will range from about 2 to about 50% by weight and preferably from about 10 to about 40% by weight of the total composition.

The conventional flame retardant additive (c) is well known. These will be based on elementary red phosphorus, phosphorus compounds, halogen or nitrogen compounds alone or preferably in further combination with synergists, such as antimony compounds. Especially useful are polymeric and oligomeric flame retardant agents comprising tetrabromobisphenol-A carbonate units. See, for example Wambach, U.S. Pat. No. 3,833,685. Also preferred are halogenated aromatic ethers, such as decabromodiphenyl ether, or poly(2,6-dibromo-1,4-phenylene)ether, and the like. The amounts used are conventional and well known. For example, component (c) can comprise from 3 to 20%, preferably from 5 to 15% by weight of the total weight of the composition.

A wide variety of mineral fillers can be used in the thermoplastic compositions of this invention. Representative of these fillers are included clays, like kaolin and calcined clays, silicas, such as novaculites, ground sands and amorphous glasses; mica, talc, pyrophillites, mineral wools, wollastonites and mixtures of the same. Clays and especially treated kaolin clays, such as that known as Translink-445, available from the Freeport Kaolin Company, silica, talc and mica are preferred herein. Amounts of from about 5% to about 40% by weight of the total composition, of mineral filler are contemplated herein. Preferably 10–30% by weight of mineral filler is used. Typical treating agents for the mineral fillers are gamma-aminopropyltriethoxysilane, gamma-glycidoxypropyltrimethoxysilane, and beta-(3,4-epoxycyclohexyl)ethyltrimethoxysilane.

Other ingredients, such as dyes, pigments, drip retardants, and the like, can be added for their conventionally employed purposes.

The compositions of this invention can be prepared by a number of procedures. The best way is to form an intimate admixture of components (a),(b) and (c) in the presence of an effective amount of mineral filler (d). They can for example be put into an extrusion compounder to produce molding pellets. The modifiers and mineral filler are dispersed in a matrix of the polyester resin in such a process. In another procedure, the polyester(s), modifier and mineral filler are mixed by dry blending, then either fluxed on a mill and comminuted, or then are extruded and chopped. The mineral filler can also be mixed with the resins and modifiers and directly molded, e.g., by injection or transfer molding techniques, but this is not preferred.

It is also important to thoroughly free all of the ingredients: resin, modifier, flame retardant, mineral filler, and any optional, conventional additives from as much water as possible.

In addition, compounding should be carried out to ensure that the residence time in the machine is short; the temperature is carefully controlled; the friction heat is utilized; and an intimate blend between the resin, the modifier, the flame retardant additive and the mineral filler is obtained.

Although it is not essential, best results are obtained if the ingredients are pre-compounded, pelletized and then molded. Pre-compounding can be carried out in conventional equipment. For example, after carefully pre-drying the polyester and modifier and the mineral filler, e.g., 4 hours at 250° F., a single screw vacuum vented extruder is fed with a dry blend of the ingredients, the screw employed having a long transition section to ensure proper melting. On the other hand, a twin screw machine, e.g., a 53 mm. Werner Pfleiders machine can be fed with resin and additives at the feed port and mineral filler downstream. In either case, a generally suitable machine temperature will be about 450°–560° F.

The pre-compounded composition can be extruded and cut up into molding compounds such as conventional granules, pellets, etc., by standard techniques.

The compositions can be molded in any equipment conventionally used for glass-filled thermoplastic compositions, e.g., a Newberry type injection molding machine with conventional cylinder temperatures, e.g., 450°–535° F. and conventional mold temperatures, e.g., 130°–200° F.

DESCRIPTION OF THE PREFERRED EMBODIMENTS

The following examples illustrate the invention. They are set forth as a further description but are not to be construed as limiting. All parts are by weight.

EXAMPLE 1

A dry blend of poly(1,4-butylene terephthalate), ethylene-vinyl acetate copolymer, aromatic polycarbonate, flame retardant additive, mineral filler and mold release/stabilizer is compounded and extruded at 525° F. in an extruder. The extrudate is pelletized and injection molded at 490° F. (mold temperature 130° F.). For comparison purposes a non-mineral filled composition is also prepared and tested. The formulations and properties are shown in Table 1.

TABLE 1

Compositions Comprising Polyester, Ethylene Vinyl acetate Copolymer, Polycarbonate; Flame Retardant and Mineral Filler.

|  | Example | |
|---|---|---|
|  | 1 | 1A* |
| Composition (parts by weight) | | |
| Poly(1,4-butylene terephthalate)[a] | 46.7 | 66.8 |
| Ethylene Vinyl Acetate Copolymer[b] | 10.0 | — |
| Aromatic Polycarbonate[c] | 2.0 | 2.0 |
| Flame retardant additive[d] | 17.5 | 26.0 |
| Antimony Oxide[e] | 3.6 | 5.0 |
| Clay filler[f] | 20.0 | — |
| Stabilizers (to make 100) | 0.2 | 0.2 |
| Properties | | |
| Notched Izod impact, ft.lbs./in. ⅛" | 1.3 | 0.6 |
| Unnotched Izod impact, ft.lbs./in. ⅛" | 23** | 40 |
| Flexural strength, psi | 12,000 | 14,800 |
| Flexural modulus, psi | 391,000 | 385,000 |
| Tensile strength, psi | 6,800 | 8,300 |
| Elongation, % | 21 | 130 |
| Arc resistance, ASTM D-495, sec. | 70 | 30 |
| Flammability, UL Laboratories, Bull 94 | V-O | V-O |

*Control
**Average of 4 test bars: fifth did not break
[a]VALOX 315, General Electric Company, melt viscosity - 7250–9000 poise
[b]ALATHON 3180, DuPont
[c]LEXAN 101, General Electric Company
[d]50:50 wt. % copolycarbonate of bisphenol-A/tetrabromobisphenol-A
[e]Flame retardant synergist
[f]Translink 445, Freeport Kaolin Co.

The marked improvement in arc track resistance and notched Izod impact strength is especially noteworthy.

EXAMPLES 2–6

The general procedure of Example 1 is used to prepare compositions of poly(1,4-butylene terephthalate) modified with poly(ethylene terephthalate), flame retardant agent and including mineral filler. For comparison purposes, a composition without mineral filler is prepared and tested. The formulations and properties are shown in Table 2.

TABLE 2

Compositions Comprising Polyesters, Flame Retardants and Mineral Fillers

|  | Example | | | | | |
|---|---|---|---|---|---|---|
|  | 2 | 2A* | 3 | 4 | 5 | 6 |
| Composition (parts by weight) | | | | | | |
| Poly(1,4-butylene terephthalate)[a] | 25.6 | 37.4 | 25.6 | 25.6 | 25.6 | 25.6 |
| Poly(ethylene terephthalate)[b] | 15.0 | 21.9 | 15.0 | 15.0 | 15.0 | 15.0 |
| Flame retardant additive[c] | 10.2 | 15.5 | 10.2 | 10.2 | 10.2 | 10.2 |
| Antimony oxide[d] | 4.0 | 5.0 | 4.0 | 4.0 | 4.0 | 4.0 |
| Glass fiber reinforcement[e] | 20.0 | 20.0 | 20.0 | 20.0 | 20.0 | 20.0 |
| Silica filler[f] | 25.0 | — | — | — | — | — |
| filler[g] | — | — | 25.0 | — | — | — |
| Clay filler[h] | — | — | — | 25.0 | — | — |
| Clay filler[i] | — | — | — | — | 25.0 | — |
| Mica filler[j] | — | — | — | — | — | 25.0 |
| Stabilizers (to make 100) | 0.2 | 0.2 | 0.2 | 0.2 | 0.2 | 0.2 |
| Properties | | | | | | |
| Notched Izod impact, ft.lbs./in. ⅛" | 0.7 | 0.9 | 0.7 | 0.6 | 0.6 | 0.7 |
| Unnotched Izod impact, ft.lbs./in. ⅛" | 6.9 | 7.8 | 7.6 | 5.3 | 6.6 | 6.5 |
| Flexural strength, psi × $10^{-4}$ | 2.04 | 2.32 | 2.17 | 1.93 | 2.09 | 2.26 |
| Flexural modulus, psi × $10^{-6}$ | 1.15 | 0.89 | 1.15 | 1.32 | 1.21 | 1.43 |
| Tensile strength, psi × $10^{-4}$ | 1.24 | 1.47 | 1.28 | 1.28 | 1.29 | 1.42 |
| Arc resistance, ASTM D-495, sec. | 108 | 28 | 101 | 89 | 88 | 109 |
| Flammability, U.L. Laboratories, | V-O | V-O | V-O | V-O | V-O | V-O |

TABLE 2-continued

Compositions Comprising Polyesters, Flame Retardants and Mineral Fillers

| | Example | | | | |
|---|---|---|---|---|---|
| | 2 | 2A* | 3 | 4 | 5 | 6 |
| Bull 94 | | | | | | |

*Control
[a]VALOX 310, General Electric Co.
[b]VFR-738 A7C Goodyear Co.
[c]Table 1, footnote [d]
[d]Table 1 footnote [e]
[e]⅛" chopped glass
[f]NOVACITE, Malvern Mineral
[g]NOVACUP 1100, Malvern Mineral
[h]WHITEX, Freeport Kaolin Co.
[i]TRANSLINK 445, Freeport Kaolin Co.
[j]C-1000, The English Mica Co.

The superior arc track resistance with mineral fillers is readily apparent.

EXAMPLE 7

The general procedure of Example 1 is used to prepare compositions of poly(1,4-butylene terephthalate) glass fibers, flame retardant agents and mineral fillers. For comparison purposes, a composition without mineral filler is prepared and tested. The formulations used and the properties are shown in Table 3.

TABLE 3

Compositions Comprising Polyester, Glass, Fibers, Flame Retardants and Mineral Filler

| | Example | |
|---|---|---|
| | 7 | 7A* |
| Composition (parts by weight) | | |
| Poly(1,4-butylene terephthalate) | 43.0 | 56.0 |
| Glass fiber reinforcement[a] | 22.0 | 30 |
| Flame Retardant additive[b] | 6.1 | 9.0 |
| Antimony oxide[c] | 3.9 | 5.0 |
| Talc filler[d] | 25.0 | — |
| Properties | | |
| Notched Izod impact, ft.lbs./in., ⅛" | 0.7 | 1.3 |
| Unnotched Izod impact, ft.lbs./in., ⅛" | 3.8 | 12.0 |
| Flexural strength, psi | 17,000 | 28,900 |
| Flexural modulus, psi | 1,300,000 | 1,100,000 |
| Tensile strength, psi | 11,400 | 18,000 |
| Arc Resistance, ASTM D495, sec. | 125 | 4 |
| Arc Tracking Rate (in./min.) | zero | >2 |
| Flammability, UL Laboratories Bull 94 | V-O | V-O |

*Control
[a]⅛" Chopped fibers,
[b]Firemaster 935, comprising primarily of Poly(2,6-dibromo-1,4-phenylene)ether, Velsicol Chemical Corp.
[c]Flame retardant synergist
[d]C P 38-33 Pfizer Minerals Co.

Obviously, other modifications and variations of the present invention are possible in light of the above teachings. For example, other hydrated minerals, such as kaolins, alumina mono- and trihydroxide, can be used instead of the mineral fillers in the specific examples. At least part or even all of the poly(1,4-butylene terephthalate) can be replaced with block copolymers, such as those from poly(butylene terephthalate) and poly(tetramethylene oxide terephthalate) and the like. Moreover, small amounts of materials such as dyes, pigments, stabilizers, reinforcing agents, flame-retardants, plasticizers and the like, can be added to the present compositions. It is to be understood, therefore, that changes may be made in the particular embodiments of the invention described which are within the full intended scope of the invention as defined by the appended claims.

We claim:

1. A flame retardant thermoplastic molding composition having improved physical properties, the composition consisting essentially of an intimate mixture of:
   (a) a high molecular weight poly(1,4-butylene terephthalate) homo- or copolyester resin;
   (b) (i) a copolymer comprised of ethylene and vinyl acetate in combination with an aromatic polycarbonate derived from bisphenol A; or (ii) a mixture of a reinforcing amount of glass fibers and a copolymer comprised of ethylene and vinyl acetate in combination with an aromatic polycarbonate derived from bisphenol-A;
   (c) a flame retardant amount of a flame retardant additive; and
   (d) a mineral filler selected from the group consisting of silica, mica, talc, pysophillite, wollastonite and mineral wool, and mixtures of any of the foregoing; component (d) being present in an amount of from about 5 to about 40% by weight sufficient to provide electrical arc track resistance superior to that of a corresponding composition in which mineral filler component (d) is not present.

2. A composition as defined in claim 1 wherein component (a) is linear or branched.

3. A composition as defined in claim 1 wherein component (d) comprises from about 10 to 30% by weight.

4. A composition as defined in claim 1 wherein component (b) is (b) (i) and (b) (i) contains a copolymer consisting of ethylene and vinyl acetate that contains less than 50% by weight vinyl acetate, the remainder ethylene.

5. A composition as defined in claim 1 wherein, component (b) is (b) (i), and (b) (i) said copolymer is a copolymer selected from the group consisting of one derived from ethylene, vinyl acetate and carbon monoxide, ethylene, vinyl acetate and methacrylic acid, and ethylene, vinyl acetate and acrylic acid.

6. A composition as defined in claim 1 wherein flame retardant component (c) comprises a halogenated aromatic ether or a halogenated aromatic polycarbonate homo- or copolymer.

7. A composition as defined in claim 1, wherein said filler component (d) is silica, talc or mica.

8. In a process for the preparation of a flame retardant molding composition having improved physical properties comprising forming an intimate melt-blended admixture consisting essentially of:
   (a) a high molecular weight poly(1,4-butylene terephthalate) homo- or copolyester resin;
   (b) (i) a copolymer comprised of ethylene and vinyl acetate in combination with an aromatic polycarbonate derived from bisphenol-A; or (ii) a reinforcing amount of glass fibers and a copolymer comprised of ethylene and vinyl acetate in combination with an aromatic polycarbonate derived from bisohenol-A and
   (c) a flame retardant amount of a flame retardant additive;
the improvement comprising the step of including in said intimate admixture
   (d) a mineral filler selected from the group consisting of silica, mica, talc, pyrophillite, wollastonite and mineral wool, and mixtures of any of the foregoing in an amount of from about 5 to 40% by weight at least sufficient to provide the composition with electrical arc track resistance superior to that of a corresponding composition in which mineral filler component (d) is not present.

9. A process as defined in claim 8 wherein component (d) is added in an amount comprising from about 10 to 30% by weight of the total weight of the composition.

10. A flame retardant thermoplastic molding composition having improved physical properties, the composition consisting of an intimate admixture of:
(a) a high molecular weight poly(1,4-butylene terephthalate) homo- or copolyester resin; (b) (i) a copolymer comprised of ethylene and vinyl acetate in combination with an aromatic homopolycarbonate; (ii) a high molecular weight polyethylene terephthalate resin; (iii) a mixture of a reinforcing amount of glass fibers and a copolymer comprised of with an aromatic homopolycarbonate; (iv) a mixture of a reinforcing amount of glass fibers and a high molecular weight polyethylene terephthalate resin, or (v) a mixture of (i), (ii) and a reinforcing amount of glass fibers;
(c) a flame retardant amount of a flame retardant additive; and
(d) a mineral filler selected from the group consisting of silica, mica, talc, pyrophillite, wollastonite and mineral wool, and mixtures of the foregoing;
component (d) being present in an amount of from about 5 to about 40% by weight sufficient to provide electrical arc track resistance superior to that of a corresponding composition in which mineral filler component (d) is not present.

11. A flame retardant thermoplastic composition as defined in claim 10 wherein the mineral filler is silica.

12. A flame retardant thermoplastic composition as defined in claim 10 wherein the mineral filler is mica.

13. A flame retardant thermoplastic composition as defined in claim 10 wherein the mineral filler is talc.

14. A flame retardant thermoplastic molding composition as defined in claim 10 wherein the mineral filler is pyrophillite.

15. A flame retardant thermoplastic molding composition as defined in claim 10 wherein the mineral filler is wollastonite.

16. A flame retardant thermoplastic molding composition as defined in claim 10 wherein the mineral filler is mineral wool.

17. A flame retardant thermoplastic molding composition having improved physical properties, the composition consisting of an intimate admixture of:
(a) a high molecular weight poly(1,4-butylene terephthalate) homo or copolyester resin;
(b) (i) a copolymer consisting of ethylene and vinyl acetate in combination with an aromatic homopolycarbonate; (ii) a high molecular weight polyethylene terephthalate resin; (iii) a mixture of a reinforcing amount of glass fibers and component (b) (i); (iv) a mixture of a reinforcing amount of amount of glass fibers and component (b) (ii); or (v) a mixture of a reinforcing amount of glass fibers, component (b) (i) and component (b) (ii);
(c) a flame retardant amount of a flame retardant additive; and
(d) a mineral filler selected from the group consisting of silica, mica, talc, pyrophillite, wollastonite and mineral wool, and mixtures of the foregoing;
component (d) being present in an amount of from about 10 to about 30% by weight sufficient to provide electrical arc track resistance superior to that of a corresponding composition in which mineral filler component (d) is not present.

* * * * *